United States Patent [19]

Steidle

[11] 4,354,426

[45] Oct. 19, 1982

[54] EXPANSION-CONTROLLED LIGHT ALLOY PISTON

[75] Inventor: Werner Steidle, Bad Friedrichshall, Fed. Rep. of Germany

[73] Assignee: Karl Schmidt GmbH, Neckarsulm, Fed. Rep. of Germany

[21] Appl. No.: 212,289

[22] Filed: Dec. 3, 1980

[30] Foreign Application Priority Data

Dec. 6, 1979 [DE] Fed. Rep. of Germany ....... 2949091

[51] Int. Cl.[3] .................................................. F16J 1/04

[52] U.S. Cl. ......................................... 92/235; 92/238

[58] Field of Search ................. 92/225, 214, 234, 235, 92/238, 239, 231

[56] References Cited

U.S. PATENT DOCUMENTS

| | | | |
|---|---|---|---|
| 1,526,883 | 2/1925 | Tryon | 92/225 |
| 1,792,504 | 2/1931 | Nelson | 92/228 |
| 1,949,542 | 3/1934 | Larkin | 92/235 |
| 2,086,677 | 7/1937 | Nelson | 92/228 |
| 2,129,180 | 9/1938 | Long | 92/228 |
| 2,238,087 | 4/1941 | Bowser | 92/228 |
| 2,551,488 | 5/1951 | Deming | 92/228 |
| 3,259,028 | 7/1966 | Hutto | 92/230 |
| 3,434,398 | 3/1969 | Gessinger | 92/235 |
| 3,613,521 | 10/1971 | Itano | 92/231 |

FOREIGN PATENT DOCUMENTS

| | | | |
|---|---|---|---|
| 1949581 | 4/1971 | Fed. Rep. of Germany | 92/255 |

*Primary Examiner*—Martin P. Schwadron
*Assistant Examiner*—Ali I. Tangoren
*Attorney, Agent, or Firm*—Sprung, Horn, Kramer & Woods

[57] ABSTRACT

To provide for separate expansion control actions at the top and bottom edges of the skirt of an expansion-controlled light alloy piston, to prevent a direct propagation of deformation between the top and bottom edges of the skirt and to reduce the skirt area between the top and bottom edges of the skirt, the skirt of the piston is provided at its periphery with a transverse slot, which extends around the entire periphery of the skirt or part thereof and is disposed on the level of the piston pin boss.

6 Claims, 1 Drawing Figure

EXPANSION-CONTROLLED LIGHT ALLOY PISTON

BACKGROUND OF THE INVENTION

1. Field of the Invention

This invention relates to an expansion-controlled light alloy piston.

2. Discussion of Prior Art

Light alloy pistons for a conversion of thermal energy to mechanical energy have become firmly established in modern internal combustion engines. Such pistons must meet numerous requirements under all operating conditions. It is always desired that the light alloy pistons move exactly along a straight line although the coefficient of expansion of the piston material differs greatly from that of cylinders consisting of grey cast iron.

A concept underlying all piston designs of that kind is to provide expansion-inhibiting steel inserts, which prevent an undesired thermally induced increase in diameter of the piston and ensure that the piston clearances in the pressure and backpressure directions match the diameter of the cylinder under all operating conditions, as far as possible. That action is described as expansion control.

Under thermal load and gas pressures applied, the cylinder of an internal combustion engine deforms in radial and axial directions and hardly retains its cylindrical shape. The piston follows these deformations by necessity and must adapt itself thereto by a change of clearance and elastic deformation although very high elasticities are detrimental.

When a load is applied to the top edge, the latter is deformed and the bottom edge is deformed to a larger extent so that the stiffness of the piston skirt is adversely affected. The stiffness of the skirt is the resistance of the skirt to a deformation by a force. When a load applied to its top edge causes the piston to tilt about its top edge, the operating clearance at the bottom edge will be increased by the resulting resilient excursion. At the same time, the inclination of the piston will be increased so that head impacts may occur and the skirt noise may be increased. Similar remarks are applicable to the tilting about the bottom edge of the skirt.

This effect occurs increasingly in conventional expansion-controlled pistons because the deformation is increasingly transmitted from the stiff top edge of the skirt to the more elastic bottom edge of the skirt.

The expansion control characteristic of the piston depends on the coefficient of expansion and on the temperature gradient between the head and skirt of the piston. The coefficient of expansion and the temperature drop differ for each piston type and are influenced by structural features and engine features.

The straight-line motion of the piston depends decisively on the cooperation of the piston clearance, the expansion control action and the deformation of the skirt. A compromise must always be found between the requirements regarding an adequate strength depending on shape, smooth running, freedom from seizing, oil consumption, friction loss and weight because the stiffness and expansion control action partly influence each other.

The motion of a piston depends mainly on its clearances during operation. For this reason it is of prime importance to provide a piston which has almost the same clearances under all operating conditions. In the expansion-controlled pistons used for this purpose, the natural expansion of the skirt in the direction of movement is reduced. Known pistons of this kind have a transverse slot, which separates the head and the ring zone from the skirt. Some of these pistons have a skirt provided with a steel insert. Such pistons have a satisfactory expansion control action but their use is restricted by the fact that their strength depending on shape is inadequate.

Owing to considerations relating to strength and temperatures, motors for higher loads are provided with expansion control pistons which have steel inserts and have no transverse slot between the top edge of the shaft and the ring zone. It has been found that disadvantages of these structures reside in that either the expansion control action is poor or, where the expansion control action is locally satisfactory, there are large differences between the extent of the expansion control actions at the top and bottom edges of the skirt. Particularly where ring- or band-shaped inserts are provided near the top end of the skirt, even an inverse expansion control action has been detected in the lower part of the skirt, i.e., the expansion is larger than that which is due to the natural expansion of the base material. None of these designs permits a separate influence to be exerted on the expansion control action at the top and bottom edges of the skirt.

To permit such pistons to be designed so that they will not seize under full load, the contour to which the piston is ground is locally recessed to a larger extent or the piston is installed with a clearance which is larger than that of the slotted expansion-controlled pistons. These measures result in larger clearances during cold starting and operation under partial load so that the straight-line motion and noise of the piston will be adversely affected. (It is an object of a good expansion-controlled piston to ensure that the clearance will be minimized throughout the speed and load ranges.) Whereas an expansion-controlled piston having steel inserts has more favorable clearance than an all-aluminum piston, the former is heavier. There is a tendency to increasingly limit the piston weight because it calls for mass balancing. For this reason it is a further object to provide an expansion-controlled piston which is light in weight.

Tests have shown that the friction losses of the engine can be decreased by 3 to 5% of the useful horsepower of the engine if the surface area of the piston skirt is decreased.

In view of the foregoing considerations, it is an object of the invention to provide a piston where coefficients of expansion at the top and bottom edges of the piston skirt can be separately controlled, and an adjustment of predetermined coefficients of expansion at the top and bottom edges of the skirt can be accomplished.

It is a further object to provide such a piston where direct propagation of a deformation between the top and bottom edges of the piston skirt is prevented.

It is a further object to provide such a piston where the skirt surface area between the top and bottom edges of the skirt is decreased.

SUMMARY OF THE INVENTION

These objects are accomplished in that the skirt of the piston is provided at its periphery with a transverse slot, which extends around the entire periphery of the skirt or part thereof and is disposed on the level of the piston pin bosses.

According to a further feature of the invention, the transverse slot widens from the carrying portions of the skirt toward the piston pin bosses into the upper and lower parts of the skirt to define a widened ring-shaped zone within the interior of the piston.

The lower part of the skirt is connected to the piston pin boss so that the upper and lower parts constitute lugs which are similar to sliding shoes adjacent to the carrying portions of the skirt. As a result, the means for guiding the skirt consist of two parts.

To ensure that the lateral forces can be taken up by the lower part of the skirt, the lower part is provided on the inside with a stiffening collar designed on the inner periphery of the lower skirt.

To ensure that the lateral forces can be taken up by the lower part of the skirt, an expansion control element is suitably provided in the upper part of the skirt.

In the piston of the invention, the expansion of the top edge of the skirt is controlled by an expansion control element and the expansion of the bottom edge of the skirt by a temperature control. The direct flow of heat to the bottom edge of the skirt is interrupted. As heat is supplied only through the boss, the boss temperature is much higher than the temperature of the skirt at its bottom edge. The expansion control action is due to the temperature differences in a plane on the increased expansion in the direction of the pin.

Owing to the design of the piston skirt according to the invention, a load applied to its top edge does not result in a deformation of the bottom edge of its skirt, and a load applied to its bottom edge does not result in a deformation of the top edge of the skirt. As a result, a load applied to the top edge does not additionally increase the clearance at the bottom edge in operation. This results in an improved skirt guidance and a lower oil consumption.

Because the axial length of the upper part of the skirt is relatively small, the expansion control element can be smaller in height than in the known expansion-controlled pistons so that there is an additional saving of weight.

Moreover, the expansion control action at the top edge of the piston skirt is improved.

In general, the wall thickness of the parts of the skirt can be selected to provide for any desired expansion control action at the top edge and at the bottom edge of the skirt. There is no inversion of the coefficient of expansion.

An upright ground contour providing for a satisfactory straight-line motion is thus obtained. The skirt according to the invention can be used in segment strip pistons, ring strip pistons, band strip pistons and pistons with bimetal strips. The pistons can be made of light weight material especially light weight metals e.g. aluminum. The forces applied to the bottom and top edges of the skirt are taken up separately. The piston is improved mainly to take up forces at right angles. This applies to the forces applied to the skirt if the frictional forces can be neglected, as is permissible because with a coefficient of friction of 0.01 the frictional forces amount to only 1% of the lateral forces. For this reason the portion which supports the boss may be narrow. The particular shape of the zone inwardly of the piston implies an additional saving of weight and a better lubrication between the cylinder and the piston.

In a high-strength version of the piston, the upper skirt part is directly connected to the ring zone. In pistons for small loads, the upper part of the skirt can be separate from the ring zone.

BRIEF DESCRIPTION OF THE DRAWINGS

The invention is shown by way of example employing the annexed drawings in which.

DESCRIPTION OF SPECIFIC EMBODIMENTS

Figure 1:
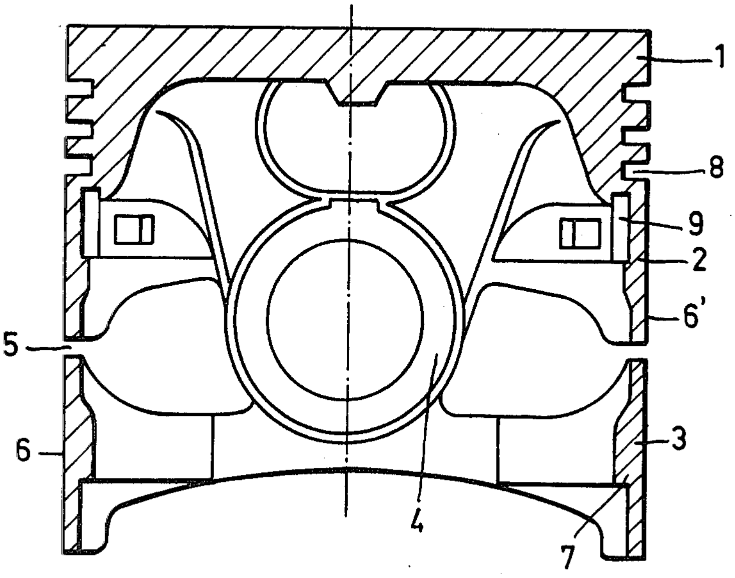
FIG. 1 is a longitudinal sectional view on the pressure/back pressure plane of the piston and FIG. 2 a longitudinal sectional view on the pin plane of the two piston halves and a side elevation showing the right-hand half of the piston.
Figure 2:
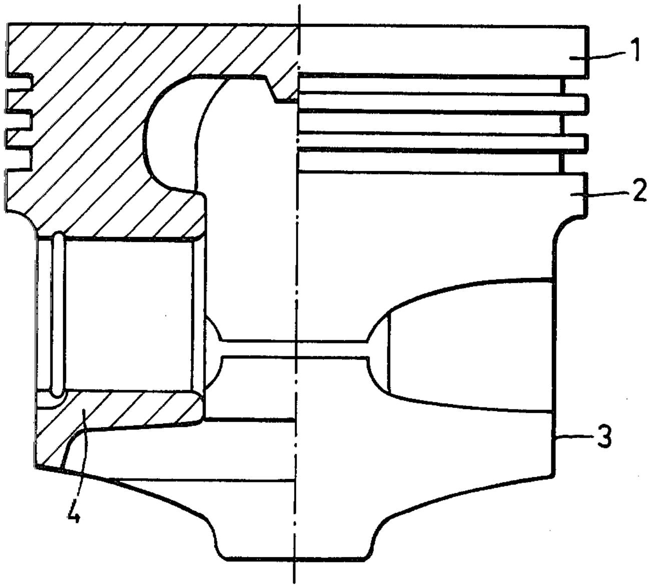

The piston consists of a piston head 1 and of the upper part 2 and the lower part 3 of the skirt. The two parts 2 and 3 of the skirt are separated by a transverse slot 5, which is disposed approximately on the level of the piston pin bosses 4 and is arcuately widened upwardly and downwardly from the regions 6, 6' of the carrying portions of the skirt. The lower part 3 of the skirt comprises a stiffening collar 7, which is joined to the piston pin boss 4.

A segment strip 9, which constitutes an expansion control element, is embedded in the skirt casting between the piston pin bosses 4 and the lower-most ring groove 8. The expansion control element 9 is adapted to define a gap, which separates the top edge of the upper part 2 of the skirt from the ring zone.

What is claimed is:

1. An expansion controlled light alloy piston consisting essentially of at least one piston ring below which is disposed a piston skirt, said piston having therewithin a piston pin boss, said skirt being provided on its periphery with a transverse slot which extends around the entire periphery of the skirt or part thereof to define an upper part of said skirt and a lower part of said skirt, said transverse slot being disposed at a level of said piston pin boss, said piston having a constant diameter over the length of said skirt and said piston pin boss being integral with the upper part of said skirt and the lower part of said skirt, which upper and lower parts of said skirt are connected to an outer portion of said piston pin boss.

2. An expansion-controlled light alloy piston according to claim 1, wherein the transverse slot widens inwardly of the surface of the piston skirt in a direction toward the piston pin boss in the upper and lower parts of the skirt of the piston.

3. An expansion-controlled light alloy piston according to claim 1, wherein the lower part of the skirt is connected to the piston pin bosses.

4. An expansion-controlled light-alloy piston according to claim 1, wherein the lower part of the skirt is provided on its inside with a stiffening collar disposed around the inner periphery of the lower part of the skirt.

5. An expansion-controlled light alloy piston according to claim 1, wherein an expansion control element is provided in the upper part of the skirt.

6. An expansion-controlled light alloy piston according to claim 5, wherein said expansion control element is in the form of a segment strip disposed interiorly and next to the exterior wall of the upper skirt between the piston pin boss and the lowermost ring groove of the piston and defines a gap at the upper part of the top edge of the ring zone.

* * * * *